(12) United States Patent
Pajona et al.

(10) Patent No.: US 10,932,284 B2
(45) Date of Patent: Feb. 23, 2021

(54) ADAPTIVE ANTENNA FOR CHANNEL SELECTION MANAGEMENT IN COMMUNICATIONS SYSTEMS

(71) Applicant: Ethertronics, Inc., San Diego, CA (US)

(72) Inventors: Olivier Pajona, Antibes (FR); Laurent Desclos, San Diego, CA (US)

(73) Assignee: Ethertronics, Inc., San Diego, CA (US)

( * ) Notice: Subject to any disclaimer, the term of this patent is extended or adjusted under 35 U.S.C. 154(b) by 13 days.

(21) Appl. No.: 15/703,794

(22) Filed: Sep. 13, 2017

(65) Prior Publication Data

US 2018/0007703 A1    Jan. 4, 2018

Related U.S. Application Data

(63) Continuation-in-part of application No. 15/423,572, filed on Feb. 2, 2017, now abandoned.

(Continued)

(51) Int. Cl.
*H04W 72/12* (2009.01)
*H04W 24/02* (2009.01)
*H04W 84/12* (2009.01)

(52) U.S. Cl.
CPC ....... *H04W 72/1226* (2013.01); *H04W 24/02* (2013.01); *H04W 72/1231* (2013.01); *H04W 72/1236* (2013.01); *H04W 84/12* (2013.01)

(58) Field of Classification Search
CPC ............. H04W 72/1226; H04W 24/02; H04W 72/1231; H04W 72/1236; H04W 84/12
See application file for complete search history.

(56) References Cited

U.S. PATENT DOCUMENTS 6,765,536 B2    7/2004    Phillips et al.
6,987,493 B2    1/2006    Chen
(Continued)

FOREIGN PATENT DOCUMENTS

GB    201516901    * 11/2015    ......... H04L 41/0806

OTHER PUBLICATIONS

PCT International Search Report and Written Opinion for corresponding PCT Application No. PCT/US2018/050630, dated Feb. 7, 2019, 12 pages.

*Primary Examiner* — Un C Cho
*Assistant Examiner* — Yu-Wen Chang
(74) *Attorney, Agent, or Firm* — Dority & Manning, PA

(57) ABSTRACT

The disclosure concerns a communication system where adaptive antenna systems with algorithm are used to provide improved channel selection management in Wireless Local Area Network (WLAN) and other multi-node communication systems. The adaptive antenna systems can be integrated into multiple nodes of a communication network, such as access points used in WLAN, and multiple radiation modes generated and tracked to determine optimal mode for access point to client communication links to assist in channel selection across the nodes in the network. Adaptive antenna system modes are selected and Signal to Noise Ratio (SNR) is measured across available frequency channels to determine channels to assign per access point along with radiation modes to be implemented that results in improved SNR for the communication links established in the network.

9 Claims, 8 Drawing Sheets

Related U.S. Application Data

(60) Provisional application No. 62/290,422, filed on Feb. 2, 2016.

(56) References Cited

U.S. PATENT DOCUMENTS

| | | |
|---|---|---|
| 7,068,234 B2 | 6/2006 | Sievenpiper |
| 7,215,289 B2 | 5/2007 | Harano |
| 7,830,320 B2 | 11/2010 | Shamblin |
| 7,911,402 B2 | 3/2011 | Rowson et al. |
| 8,362,962 B2 | 1/2013 | Rowson et al. |
| 8,446,318 B2 | 5/2013 | Ali et al. |
| 8,648,755 B2 | 2/2014 | Rowson et al. |
| 8,717,241 B2 | 5/2014 | Shamblin et al. |
| 9,065,496 B2 | 6/2015 | Rowson et al. |
| 9,231,669 B2 | 1/2016 | Desclos et al. |
| 9,240,634 B2 | 1/2016 | Rowson et al. |
| 9,425,497 B2 | 8/2016 | Pajona et al. |
| 9,439,151 B2 | 9/2016 | Zhu et al. |
| 9,479,242 B2 | 10/2016 | Desclos et al. |
| 9,590,703 B2 | 3/2017 | Desclos et al. |
| 9,755,305 B2 | 9/2017 | Deslos et al. |
| 9,755,580 B2 | 9/2017 | Desclos et al. |
| 2006/0292988 A1* | 12/2006 | Yuen .................... H04B 17/373 455/62 |
| 2008/0248802 A1* | 10/2008 | Krishnamoorthy .. H01Q 3/2605 455/445 |
| 2009/0232064 A1* | 9/2009 | Zhang .................... H04L 5/0007 370/329 |
| 2012/0207048 A1* | 8/2012 | Kim ...................... H04W 72/082 370/252 |
| 2013/0109327 A1* | 5/2013 | Matsumori ........... H04W 24/02 455/73 |
| 2013/0169481 A1* | 7/2013 | Takatsuka ............ H04B 7/0617 342/372 |
| 2014/0055302 A1* | 2/2014 | Jia ............................ H01Q 3/34 342/372 |
| 2014/0376534 A1* | 12/2014 | Pajona .................. H04W 24/02 370/338 |
| 2015/0003404 A1* | 1/2015 | Gokturk ............ H04W 72/0453 370/330 |
| 2015/0180561 A1* | 6/2015 | Jindal ............... H04L 25/03898 375/267 |
| 2015/0223160 A1* | 8/2015 | Ho ........................ H04W 48/20 370/338 |
| 2015/0244071 A1* | 8/2015 | Shirakata .............. H04W 24/08 342/368 |
| 2016/0285654 A1* | 9/2016 | Gavert .................. H04L 1/0002 |
| 2017/0093457 A1* | 3/2017 | Jain ........................ H04B 1/401 |
| 2017/0156119 A1* | 6/2017 | Neves ................. H04W 52/283 |

\* cited by examiner

Noise matrix (dB) for one AP

|  | AP | | | |
|---|---|---|---|---|
|  | Adaptive mode 1 | Adaptive mode 2 | Adaptive mode 3 | Adaptive mode 4 |
| Average noise reported in configuration C1 | 2 | 5 | 2 | 1 |
| Average noise reported in configuration C2 | 9 | 8 | 5 | 6 |
| ... | ... | ... | ... | ... |
| Average noise reported in configuration Cn | 5 | 4 | 3 | 5 |

FIG. 5

ADAPTIVE ANTENNA FOR CHANNEL SELECTION MANAGEMENT IN COMMUNICATIONS SYSTEMS

CROSS-REFERENCE TO RELATED APPLICATIONS

This application is a continuation in part (CIP) of U.S. Ser. No. 15/423,572, filed Feb. 2, 2017, which further claims benefit of U.S. Provisional Application Ser. No. 62/290,422, filed Feb. 2, 2016; the entire contents of each of which are hereby incorporated by reference.

BACKGROUND

Field of the Invention

This invention relates generally to the field of wireless communication; and more particularly, to an adaptive antenna system for improved channel selection management in wireless local area network (WLAN) and other multi-node communication systems.

Description of the Related Art

WLAN has been adopted across homes and businesses in most regions of the world, with a large number of client devices such as smartphones, laptops, and tablets capable of WLAN reception. More recently, WLAN has been adopted for high throughput applications such as video streaming for in-building applications. These devices require good performance from the RF radio and antenna system to ensure quality operation; and these devices increase the number of WLAN antenna systems and RF signaling encountered in businesses, apartment buildings, and neighborhoods. The requirement for increased data rates to support a larger number of users and video applications points towards a need for higher orders of modulation in the transmitted signal, which in turn places a requirement on improved levels of Signal to Noise Ratio (SNR) or Signal to Interference plus Noise Ratio (SINR), collectively "metrics", to support the higher modulation rates. Specifically, better control of the radiated field from the antenna system associated with the access point will be required to provide better communication link quality for an antenna system tasked to provide higher throughput and a more reliable link.

Due to range limitations of electromagnetic (EM) signals propagating in-building at the WLAN frequency bands, it is becoming more common to have multiple access points configured in a network to provide continuous wireless service. WLAN internal roaming involves a situation wherein a wireless device moves the connection from one access point to another within a Wi-Fi network because the signal strength from the original access point gets too weak. The wireless device may include an algorithm to periodically monitor the presence of alternative access points, which may provide a better connection, and to re-associate itself with an access point having a stronger signal. However, due to the complex nature of radio propagation, it is difficult to predict Wi-Fi signal strength for a given area in relation to a transmitter. In many instances, the line of sight between a transmitter and a receiver involved in the communication becomes blocked or shadowed with obstacles such as walls, trees and other objects. Each signal bounce may introduce phase shifts, time delays, attenuations and distortions, each of which ultimately interferes at the receiving antenna. Destructive interference in the wireless link is problematic and results in degradation of device performance. A signal quality metric is often used to assess the quality of signals. Examples of such quality metrics, as introduced above, may include signal-to-noise ratio (SNR), signal to interference-plus-noise ratio (SINR), receive signal strength indicator (RSSI), bit error rate (BER) and various other metrics, which are called channel quality indicators (CQI).

Increasing the number of access points in a Wi-Fi network generally provides network redundancy and support for fast roaming by defining smaller cells. However, Wi-Fi connections may be disrupted and/or internet speed may be lowered due to interference by having too many devices in the same area connected to one access point. When multiple access points are used in a system to provide WLAN coverage for a building a standard technique is to assign a different channel (frequency) to adjacent access points to reduce interference between access points. With finite frequency bandwidth available at the 2.4 GHz and 5 GHz WLAN bands and a set number of available channels the frequency separation that can be achieved between adjacent access points is typically not large enough to eliminate the out-of-channel roll-off in frequency components radiated by one access point from interfering with a neighboring access point. This interference is typically manifested in a decrease in SINR at the receive port of the neighboring access point, which results in reduced modulation scheme that can be supported, and which translates into a reduction in data throughput. With wireless devices commonly configured with one or more antennas, with these antennas being passive antennas which have a fixed radiation pattern (i.e. one radiation pattern), the antenna system cannot be used as a tool to improve SINR of the access point when interfering signals are present. This situation leads to a sub-optimal traffic, with quality of service (QOS) offered to the users not optimized.

Commonly owned U.S. Pat. Nos. 7,911,402; 8,362,962; 8,648,755; and 9,240,634; the entire contents of each of which is hereby incorporated by reference, each describes a beam steering technique wherein a single antenna is capable of generating multiple radiating modes, wherein the single antenna exhibits a distinct radiation pattern in each of the plurality of possible modes. This is effectuated with the use of offset parasitic elements that alter the current distribution on the driven antenna as the reactive load on the parasitic is varied. This beam steering technique, where multiple modes are generated, is referred to as a "modal antenna technique", and an antenna configured to alter radiating modes in this fashion will be referred to here as a "modal antenna". This antenna architecture solves the problem associated with a lack of volume in mobile devices and small commercial communication devices to accommodate antenna arrays needed to implement more traditional beam steering hardware.

This modal antenna technique can be implemented in access points and client devices in WLAN systems and used to improve communication link performance for these networks. On the access point side of the link when multi-user operation is required the capability of optimizing the radiation pattern of the antennas in access point will be key to optimize link performance. Compared to a passive antenna used with an access point, the modal antenna can provide improved antenna gain performance in the direction of client devices by sampling the multiple radiation modes of the modal antenna and selecting the mode that provides improved system gain per client. The increased antenna system gain from the modal antenna will translate into an

BRIEF DESCRIPTION OF THE DRAWINGS

FIG. 5 illustrates a noise matrix for each access point in a communication system, where the access point and one or multiple client devices contain adaptive antenna systems.

DETAILED DESCRIPTION OF EMBODIMENTS

Figure 1:
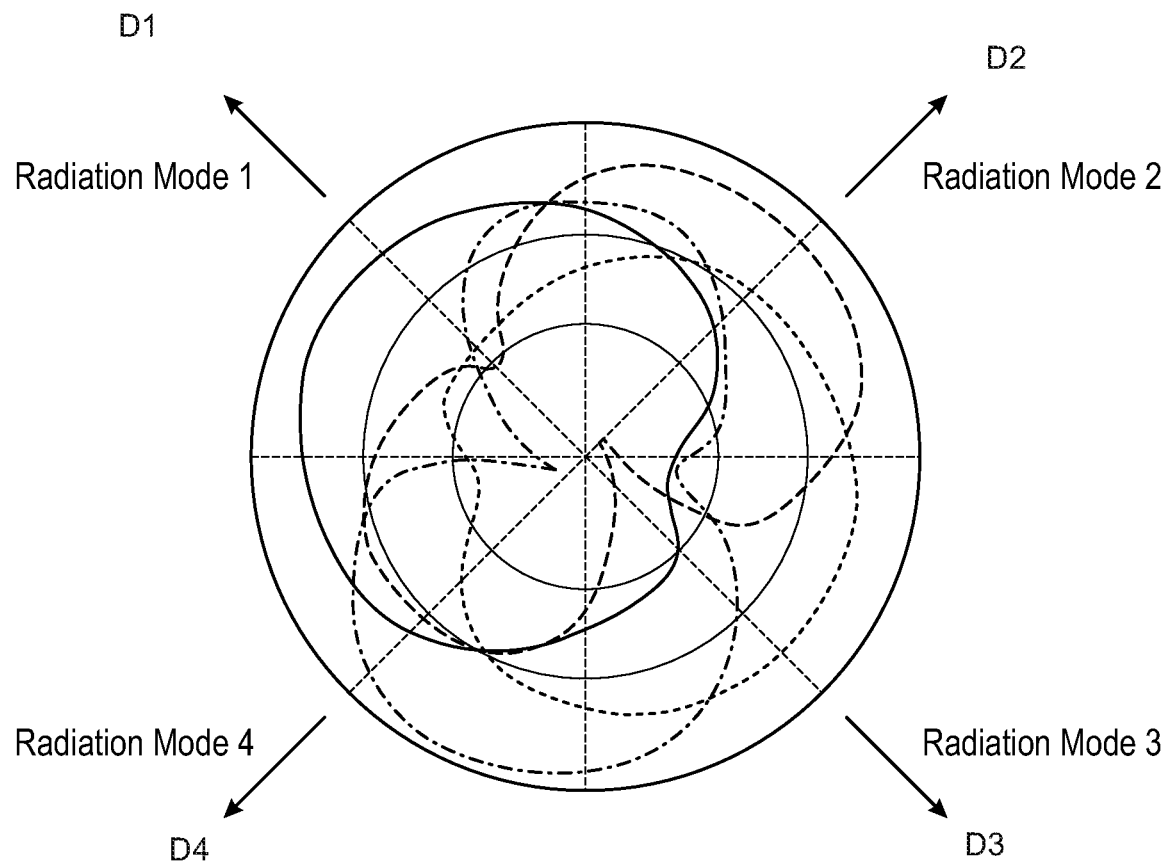
FIG. 1 illustrates a four radiation pattern modes of a single modal antenna.

This disclosure concerns an adaptive antenna system that provides multiple radiation modes that can be sampled and selected to improve communication link performance in WLAN and other communication systems. This adaptive antenna system provides an additional parametric that can be used to optimize noise levels in receivers within access points, and other transceivers implemented in communication systems, to provide higher SINR levels which in turn will translate into higher data throughput, and more reliability in maintaining communication links in multipath and dynamic environments.

In an embodiment, an adaptive antenna capable of generating a plurality of radiation modes is combined with an algorithm which implements a sampling process that selects an optimal radiation mode for the intended communication link. This technique is well suited for implementation in WLAN systems where multiple access points are tasked to provide coverage in a specific region and interference between access points needs to be addressed. With the capability of changing radiation modes of the antenna system used with the access points this technique can be used to improve SINR levels in the access points in a system by selecting modes that decrease signal strength levels in the direction of adjacent nodes. This capability of changing radiation modes of the antenna system also impact the way adjacent channels are interfering on each other. Therefore using this technique on either (i) only the devices, (ii) only the access point(s), or (iii) on both the devices and access point(s) provides extra degrees of freedom in the channel assignment process, in order to maximize the overall network performances.

In one embodiment, a communication system comprised of two nodes (access points), with each node containing a transceiver and antenna system, is used to provide wireless communication in a defined region. An example of this type of system is a WLAN system consisting of two access points (nodes) to provide wireless coverage in-building. The first access point operates on channel A while the second access point operates on channel B, with channels A and B occupying different portions of the frequency spectrum. The first access point in the system contains an adaptive antenna system with this adaptive antenna system defined as an antenna capable of generating multiple radiation modes (capable of beam steering or null steering), while the second access point contains a passive antenna system which has a fixed radiation pattern. Each radiation mode of the adaptive antenna system has a radiation pattern associated with it, with these radiation patterns varying between the modes in terms of radiation pattern shape and/or polarization properties. A candidate antenna for the adaptive antenna is a modal antenna, with the modal antenna being capable of generating multiple radiation patterns from a single port antenna. A network controller is implemented to command and control the network of access points. An algorithm is resident in a computer in the network controller with this algorithm tasked to control the radiation modes of the adaptive antenna system in the first access point, for example, by switching on/off or adjusting a reactance of active components, such as switches, tunable capacitors, tunable inductors and the like. The communication link quality between the two access points and each client in the system is measured and stored in memory. The algorithm implemented with the adaptive antenna provides the capability of surveying a channel quality indicator (CQI) metric such as Signal to Interference and Noise Ratio (SINR), Receive Signal Sensitivity Indicator (RSSI), Modulation Coding Scheme (MCS), or similar metric obtained from the baseband processor of the communication system to provide the capability to sample radiation patterns and make a decision in regards to operating on the optimal radiation pattern or mode based on the CQI. The optimization can be performed to improve SINR of the second access point by selecting radiation modes for the adaptive antenna system associated with the first access point as the first access point communicates with the clients in the system. Though the two access points are operating on different channels there is a finite amount of roll-off in frequency response that occurs, with some residual out-of-band frequency components from the first access point coupling into the receive port of the second access point. The optimization can be performed by the first access point, for example, by selecting another channel and monitoring the signal quality metrics described previously, such as the SINR, etc., for the different antennas' modes of all the devices connected to this access point.

The improvement in SINR occurs when modes of the adaptive antenna are selected that service an intended client while coupling less power into the receive port of the second access point. The result will be improved throughput, range, and capacity for communication links established between the second access point and clients in the system.

In another embodiment, the communication system as previously described is implemented where adaptive antenna systems are incorporated in both the first and second access points. The algorithm resident in a computer in the network controller is tasked to control the radiation modes of the adaptive antenna systems in the first and second access points. The first access point operates on channel A while the second access point operates on channel B, with channels A and B occupying different portions of the frequency spectrum. The optimization can be performed to improve SINR of the first and second access points by selecting radiation modes for the adaptive antenna systems associated with each of the first and second access points, respectively, as the access points communicate with the clients in the system.

In another embodiment, a plurality of access points are fielded in a communication system, with a plurality of these access points containing adaptive antenna systems. The algorithm resident in the network controller is tasked to control all adaptive antenna systems in the network, with the goal being to increase SINR in the receive ports of all access points in the system by selecting radiation modes that couple least from one access point to adjacent access point as communication links are established between access points and clients.

In another embodiment, a plurality of access points, as well as a plurality of clients, are each configured with adaptive antenna systems, to provide multiple radiation modes on both ends of the communication links established in the network. The algorithm resident in the network controller is tasked to control all adaptive antenna systems in the network, with the goal being to increase SINR in the receive ports of all access points in the system by selecting radiation modes that couple least from one access point to adjacent access point as communication links are established between access points and clients. The adaptive antenna systems on the client devices provide an additional parameter to adjust during the optimization process.

In yet another embodiment, a plurality of access points are fielded in a communication system, with a plurality of these access points containing adaptive antenna systems, with at least two access points adjacent to each other operating on the same channel. The algorithm resident in the network controller operates in the same fashion as previously described, with the end result being improved SINR in the receive ports of all access points in the system by selecting radiation modes that the couple least from one access point to adjacent access point as communication links are established between access points and clients.

The algorithm described in the previously mentioned embodiments is configured to survey the radiation modes of all adaptive antenna systems in the network. The communication link quality between all adaptive antenna enabled access points, and each client in the system, is measured and stored in memory. The algorithm implemented with the adaptive antenna provides the capability of surveying a channel quality indicator (CQI) metric such as Signal to Interference and Noise Ratio (SINR), Receive Signal Sensitivity Indicator (RSSI), Modulation Coding Scheme (MCS), or similar metric obtained from the baseband processor of the communication system to provide the capability to sample radiation patterns and make a decision in regards to operating on the optimal radiation pattern or mode based on the CQI. The optimization can be performed to improve SINR of the communication links established between access points and clients in the network by selecting radiation modes for the adaptive antenna systems associated with access points and clients in the system. The algorithm populates a noise matrix for each access point in the network that has an adaptive antenna system coupled to it. A measure of average noise for each communication link between an access point and clients in the network is performed and these noise values are stored in the noise matrix. The noise matrix associated with each access point in the network is surveyed by the algorithm, and radiation mode states are selected for the adaptive antenna systems for the access points, for access point/client pairs, such that the noise levels in receivers within the access points and clients, respectively, are minimized. The noise matrix is updated on a continuous basis to account for changes in the propagation channel and channel changes at the access points.

Now turning to the drawings, FIG. 1 illustrates a four radiation pattern modes of a single modal antenna. The modal antenna is capable of generating multiple radiation patterns (shown are four, but can be more). The four radiation modes shown provide peak gain coverage in 4 distinct directions (D1; D2; D3; and D4).

Figure 2:
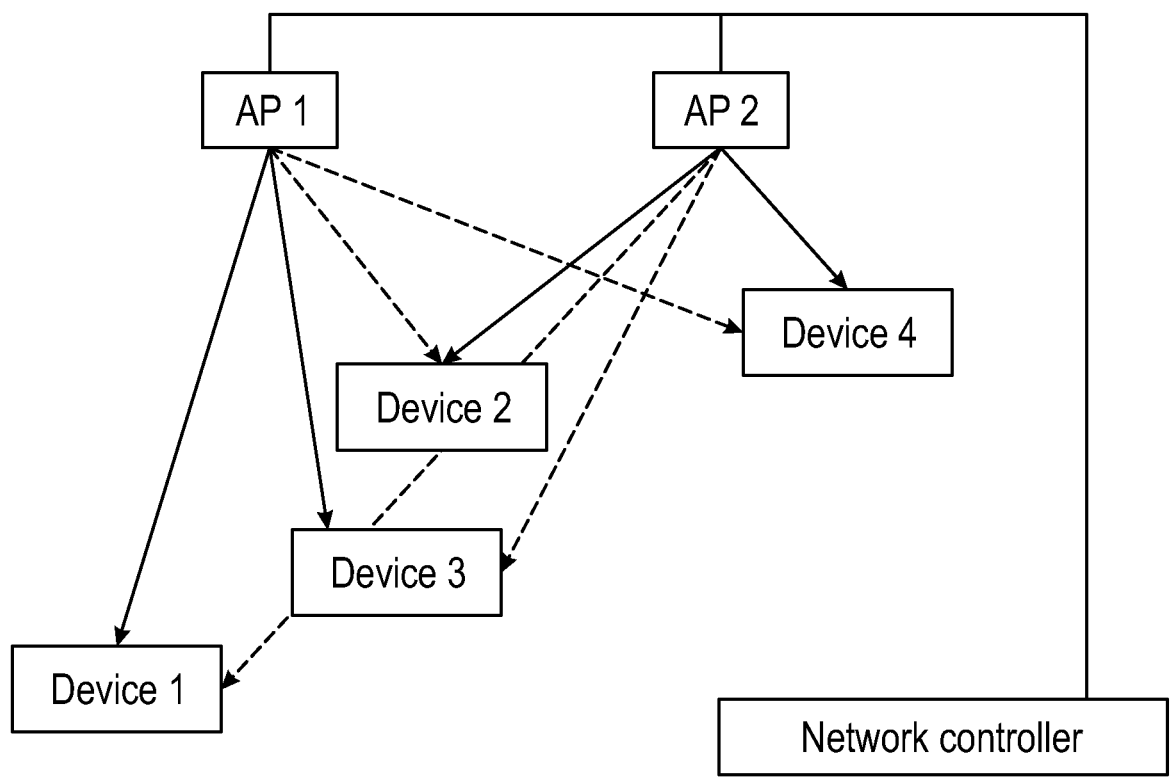
FIG. 2 illustrates a communication system comprising a network controller, two access points including a first access point labeled "AP1" and a second access point labeled "AP2", and four client devices connected wirelessly to the two access points.

FIG. 2 illustrates a communication system comprising a network controller, two access points including a first access point labeled "AP1" and a second access point labeled "AP2", and four client devices connected wirelessly to the two access points. Each access point recognizes all devices; however, system throughput is optimized by configuring a "mode" of the adaptive antenna systems of each access point, respectfully, such that the mode discriminates against unintended links (for example, a null in the radiation pattern of the particular selected mode is pointed in the direction of a client device for which link is not desired), and further such that the mode prioritizes link communication with intended client devices (for example, a gain maxima of the radiation pattern is steered toward a client device for which link is desired). Here, the first access point (AP1) is configured in a first mode, wherein the first mode is one which establishes gain in the direction of intended clients (Device 1 and Device 3) while concurrently excluding link with unintended client devices (Device 2 and Device 4). Note, however, that the second access point (AP2) is configured in a second mode such that link is established with intended clients (Device 2 and Device 4) while the mode concurrently discriminates link with unintended clients (Device 1 and Device 3). In this regard, all devices (Devices 1-4) are services on the network, however, throughput is evenly spread among access points and devices on the network, and accomplished by the control provided by network controller to configure the adaptive antenna systems of the first and second access points.

Figure 3:
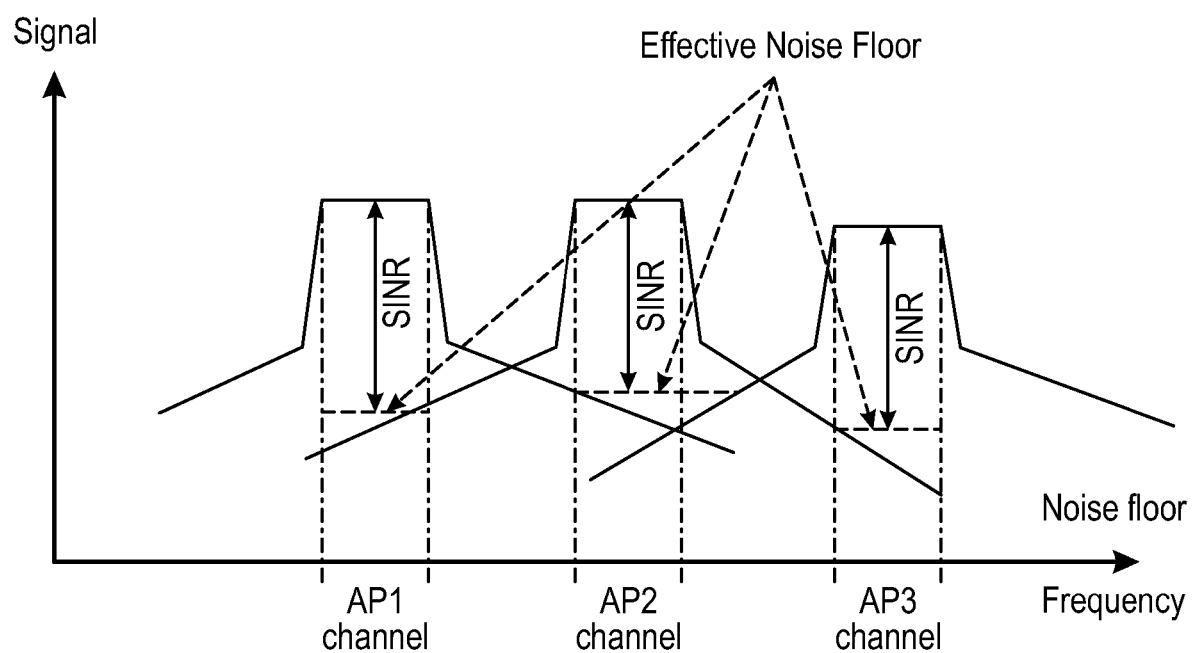
FIG. 3 illustrates a plot of channel utilization for three access points, with the three access points labeled "AP1", "AP2", and "AP3".

FIG. 3 illustrates a plot of channel utilization for three access points, with the three access points labeled "AP1", "AP2", and "AP3". The frequency response for each access point is shown along with the SINR. As can be seen in the plot, the effective noise floor of each access point is limited or set by the frequency components generated by the other access points in the communication system. The antenna systems utilized with these three access points contain traditional passive antennas, which possess a single radiation mode or radiation pattern for each passive antenna (as opposed to multiple reconfigurable antenna modes of a modal antenna).

Figure 4:
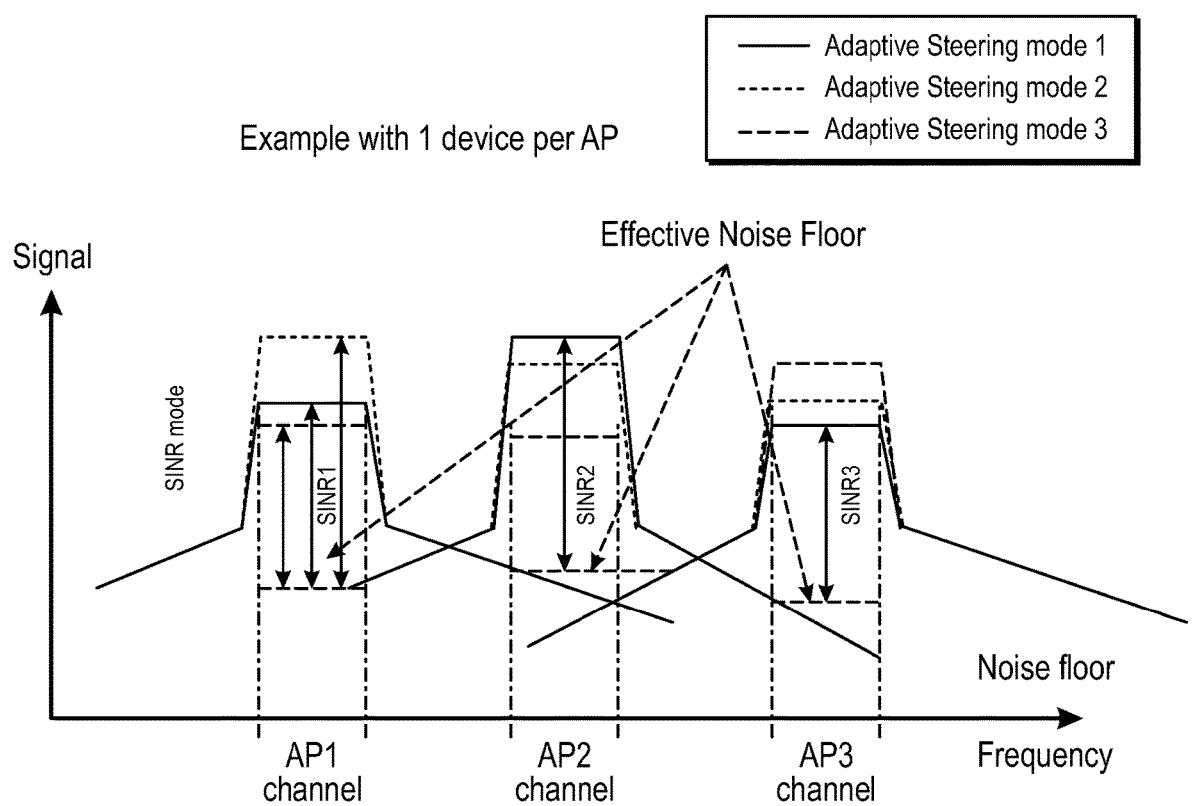
FIG. 4 illustrates a plot of channel utilization for three access points, with the three access points labeled "AP1", "AP2", and "AP3".

FIG. 4 illustrates a plot of channel utilization for three access points, with the three access points labeled "AP1", "AP2", and "AP3". The three access points have adaptive antenna systems, with these adaptive antenna systems capable of generating multiple radiation modes, wherein the antenna system produces a distinct radiation pattern in when configured in each of the plurality of modes. The frequency response for each access point is shown along with the SINR of three adaptive steering modes generated by the adaptive antenna system of each access point. With the active steering modes providing a different radiation pattern and/or polarization state from the adaptive antenna system, the SINR will vary from one mode to the next. The mode which provides the highest SINR can be selected and used for communication between access point and client device, providing improved communication performance. Further-more, the adaptive steering modes can be surveyed for multiple channels for each access point and channel selection for the access points can be performed in conjunction with the adaptive steering mode selection. The result will be improved SINR performance at each access point due to improved frequency response roll-off when optimal channel selection and adaptive steering mode selection is performed.

FIG. 5 illustrates a noise matrix for each access point in a communication system, where the access point and one or multiple client devices contain adaptive antenna systems. The average noise level in the receiver of the access point as well as in the receivers of the client devices can be determined as the active steering modes of the adaptive antenna systems are sampled. This noise matrix provides a data base to survey when selecting optimal channels for access points in the system and adaptive steering modes for use per client.

Figure 6:
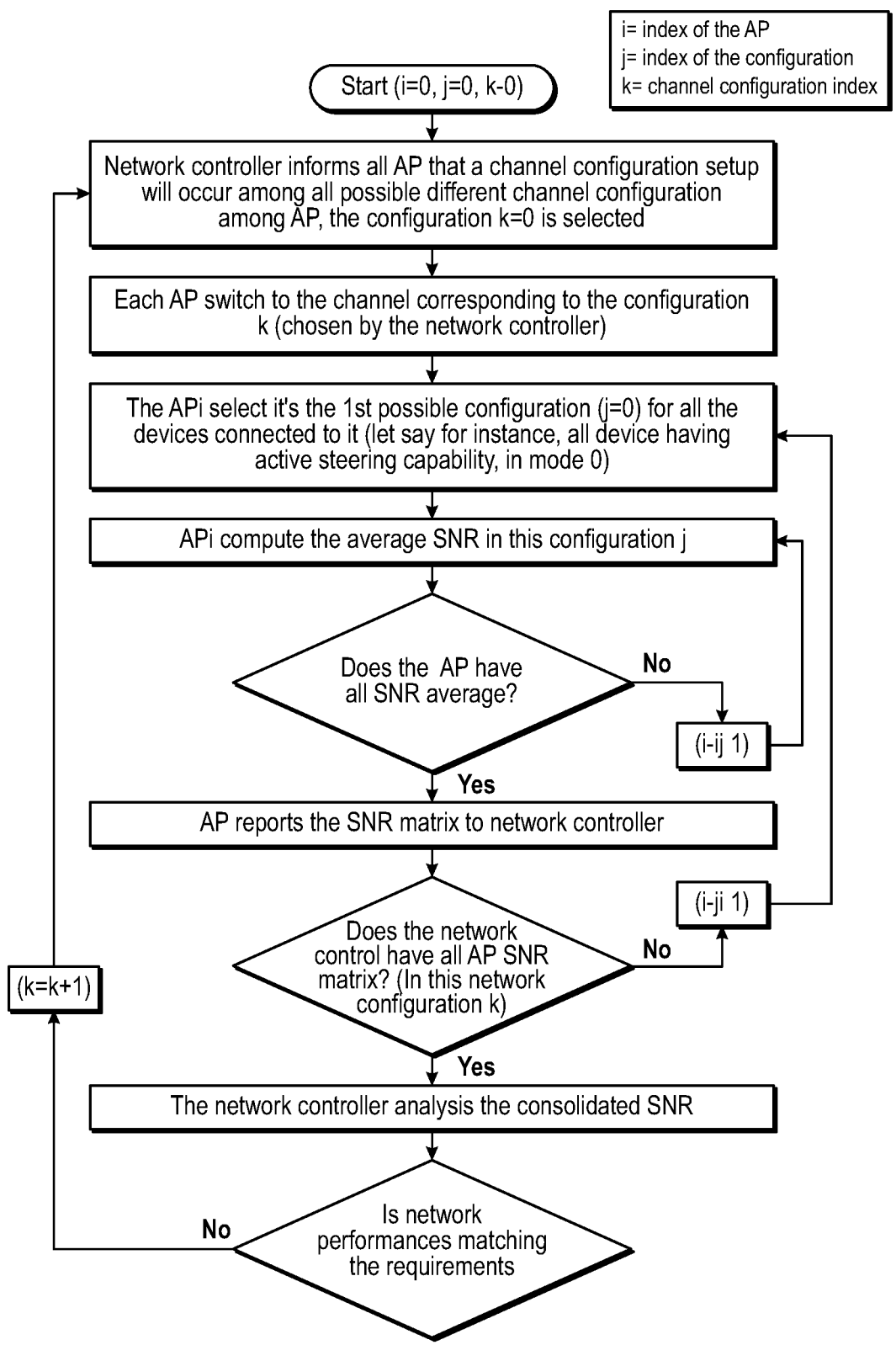
FIG. 6 illustrates a flow chart of a process to optimize channel selection per access point or node in a communication system, along with selection of optimal active steering modes for the adaptive antennas.

FIG. 6 illustrates a flow chart of a process to optimize channel selection per access point or node in a communication system, along with selection of optimal active steering modes for the adaptive antennas.

Figure 7:
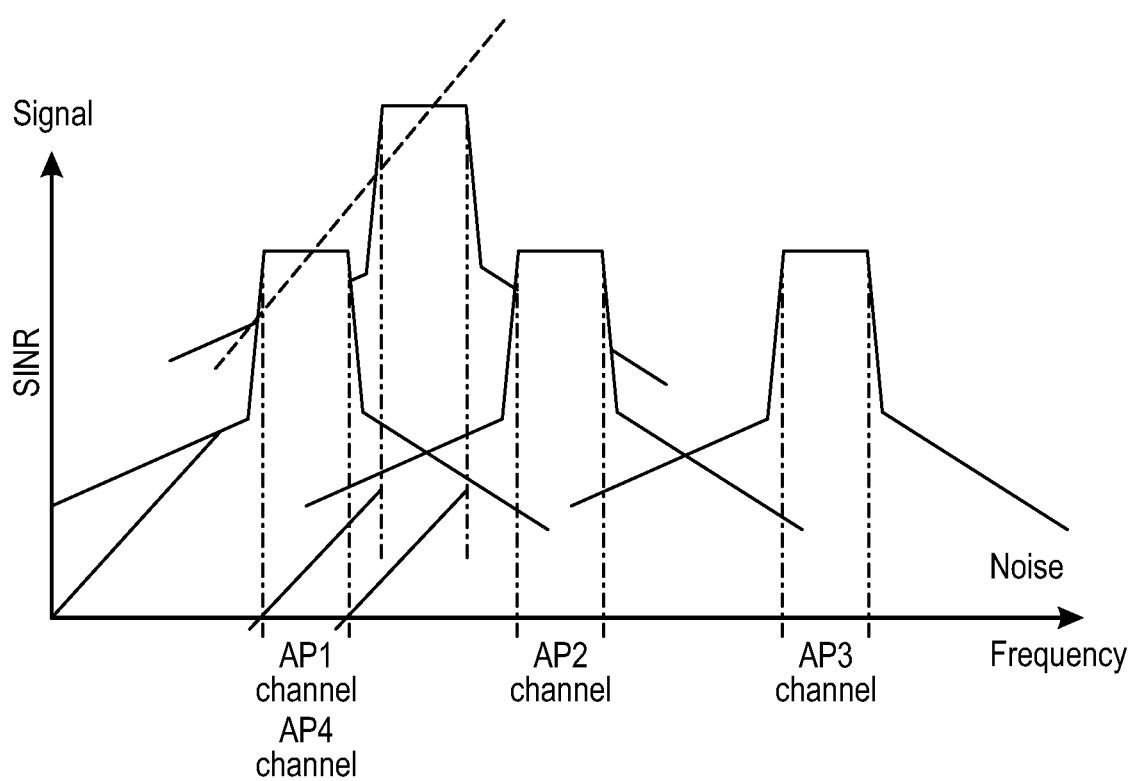
FIG. 7 illustrates a plot of channel utilization for four access points labeled "AP1", "AP2", "AP3", and "AP4".
Figure 7:
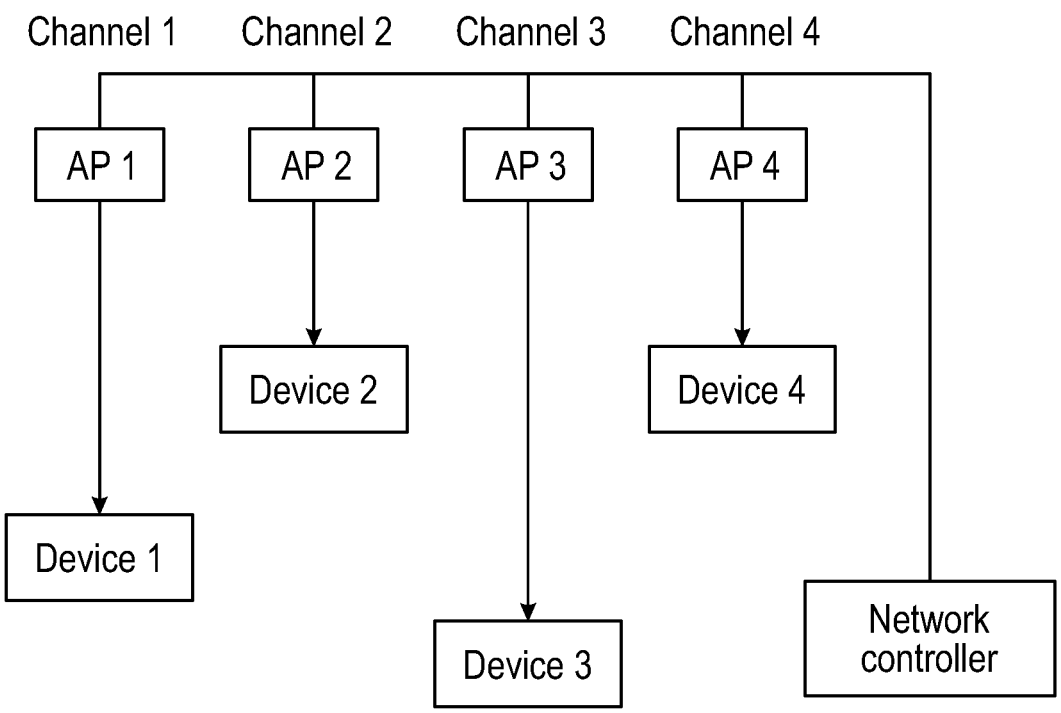

FIG. 7 illustrates a plot of channel utilization for four access points labeled "AP1", "AP2", "AP3", and "AP4". The frequency response for each access point is shown, with "AP1" and "AP4" operating on the same channel. The optimal active steering mode is shown for the frequency response of each access point.

Figure 8:
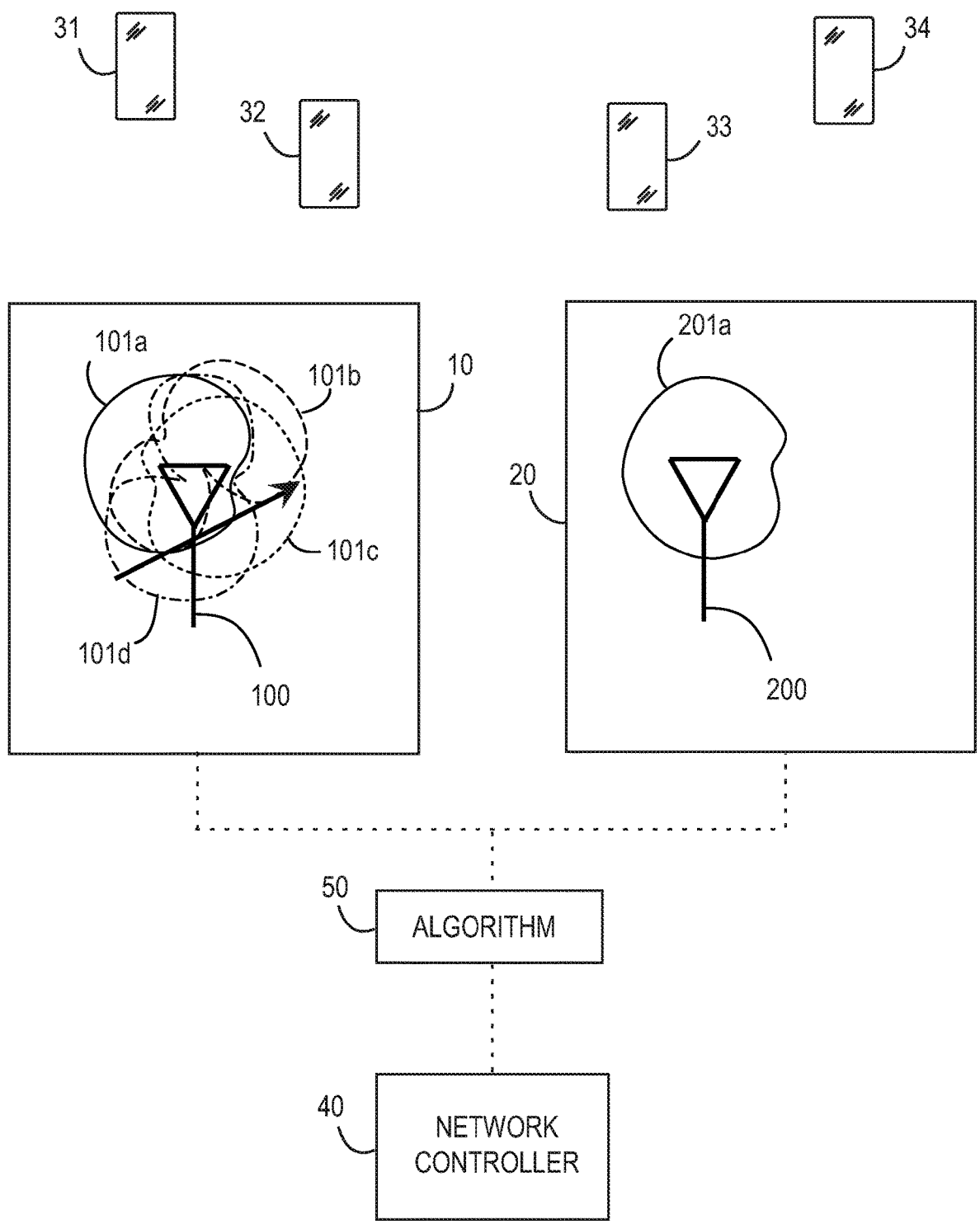
FIG. 8 shows a network communication system for servicing wireless communication links between each of a plurality of client devices and a network, respectively.

FIG. 8 shows a network communication system for servicing wireless communication links between each of a plurality of client devices 31; 32; 33; 34 and a network, respectively. The network communication system for servicing wireless communication links between each of a plurality of client devices and a network, respectively, may comprise: a first access point 10, a second access point 20, and a network controller 40. The first access point may include an adaptive antenna system 100 associated therewith, the adaptive antenna system being configurable in one of a plurality of possible modes, wherein the adaptive antenna system exhibits a distinct radiation pattern 101(a-d) when configured in each of the plurality of possible modes. The network controller 40 can be adapted to execute an algorithm 50 for determining an optimal mode of the adaptive antenna system 100 for a given time period, the algorithm comprising the steps of: (i) with the first access point, surveying each of the plurality of client devices available for communication with the network, (ii) configuring the adaptive antenna system of the first access point in each of the plurality of possible modes thereof, and for each mode, measuring a channel quality indicator (CQI) associated with the adaptive antenna system of the first access point and each of the plurality of client devices, (iii) storing, on the network, antenna mode data corresponding to each mode, device, and channel quality indicator of the adaptive antenna system as-measured, (iv) selecting the optimal mode of the plurality of possible modes based on the antenna mode data, and (v) configuring the adaptive antenna system of the first access point in the optimal mode.

The second access point 20 is shown comprising a second passive antenna 200 with a fixed radiation pattern 201a thereof. However, as discussed above, the second antenna may alternatively comprise an adaptive antenna system.

The adaptive antenna system may be characterized by: a radiating element, one or more parasitic elements positioned adjacent to the radiating element, and one or more active tuning components, each of the one or more active tuning components is coupled to one of the one or more parasitic elements and configured to adjust a current mode of the respective parasitic element.

The active tuning components may be individually selected from the group consisting of: switches, tunable capacitors, tunable inductors, MEMs devices, tunable phase shifters, and diodes.

The second access point may comprise a second adaptive antenna system being configurable in one of a plurality of possible second modes associated therewith, wherein the second adaptive antenna system exhibits a distinct radiation pattern when configured in each of the plurality of possible second modes.

The network communication system may comprise three or more access points.

The optimal mode can be the one of the plurality of possible modes which achieves maximum throughput of the network. The optimal mode may be the one of the plurality of possible modes which achieves a prioritized throughput according to a network preference for individual device throughput.

The maximum throughput may be achieved upon balancing device load among each of the access points on the network. The maximum throughput is achieved upon balancing device load among each channel of each of the access points on the network.

The antenna mode data further comprises frequency or channel information.

As described above, the CQI may be selected from the group consisting of: signal to interference and noise ratio (SINR), receive signal strength indicator (RSSI), and modulation coding scheme (MCS), or other similar metric.

In some embodiments, a communication system comprises: a first radio frequency transceiver operating at frequency F1; a first antenna system coupled to said first transceiver; a second radio frequency transceiver operating at frequency F2; a second antenna system coupled to said second transceiver; a network controller for command and control of said first and second transceivers; a plurality of client devices, with each client device containing a transmitter, a receiver, or a transceiver capable of operation at frequency F1 or F2 or both F1 and F2; wherein the first antenna system coupled to said first transceiver is an adaptive antenna system, with this adaptive antenna system capable of generating two or more radiation modes, with each radiation mode possessing a different radiation pattern and/or polarization compared to the other modes; and an algorithm is resident in the network controller, with said algorithm configured to control the changing of radiation modes of the adaptive antenna system as well as the channel used by each of the access point of the network, survey a communication link metric as the first transceiver establishes a communication link with one or a plurality of client devices utilizing the radiation modes of the adaptive antenna system, survey a communication link metric as the second transceiver establishes a communication link with one or a plurality of client devices, and select a radiation mode for the adaptive antenna system coupled to the first transceiver when the first transceiver establishes a communication link with a first client that provides a minimal noise level in the receiver of the second transceiver when the second transceiver establishes a communication link with a second client at the same time interval.

In accordance with an embodiment of the communication system, a plurality of frequencies are available for transmission and reception; the algorithm resident in the network controller is configured to control the changing of radiation modes of the adaptive antenna system as well as the channel used by each of the access point of the network, survey a communication link metric as the first transceiver establishes a communication link with one or a plurality of client devices utilizing the radiation modes of the adaptive antenna system, survey a communication link metric as the second transceiver establishes a communication link with one or a plurality of client devices, and select a radiation mode for the adaptive antenna system coupled to the first transceiver when the first transceiver establishes a communication link with a first client that provides a minimal noise level in the receiver of the second transceiver when the second transceiver establishes a communication link with a second client at the same time interval the surveying of the communication link metric for the various modes is performed at two or more frequencies, with the optimal frequency selected for the first and second transceiver to operate on for minimal noise level in the receiver of the first and second transceivers.

In another embodiment, the second antenna system coupled to said second transceiver is an adaptive antenna system, with this adaptive antenna system capable of generating two or more radiation modes, with each radiation mode possessing a different radiation pattern and/or polarization compared to the other modes; the algorithm resident in the network controller is configured to control the changing of radiation modes of the first and second adaptive antenna systems as well as the channel used by each of the access point of the network, survey a communication link metric as the first transceiver establishes a communication link with one or a plurality of client devices utilizing the radiation modes of the adaptive antenna system, survey a communication link metric as the second transceiver establishes a communication link with one or a plurality of client devices utilizing the radiation modes of the adaptive antenna system, and select a radiation mode for the adaptive antenna system coupled to the first transceiver when the first transceiver establishes a communication link with a first client that provides a minimal noise level in the receiver of the second transceiver when the second transceiver establishes a communication link with a second client and select a radiation mode for the adaptive antenna system coupled to the second transceiver when the second transceiver establishes a communication link with a second client that provides a minimal noise level in the receiver of the first transceiver when the first transceiver establishes a communication link with a first client at the same time interval; the surveying of the communication link metric for the various modes is performed at two or more frequencies, with the optimal frequency selected for the first and second transceiver to operate on for minimal noise level in the receiver of the first and second transceivers.

In various embodiments, the communication link metric is a channel quality indicator (CQI) metric such as Signal to Interference and Noise Ratio (SINR), Receive Signal Sensitivity Indicator (RSSI), Modulation Coding Scheme (MCS), or similar metric obtained from the baseband processor of the communication system to provide the capability to sample radiation patterns and make a decision in regards to operating on the optimal radiation pattern or mode based on the CQI.

The algorithm may be resident in a processor co-located with the first or second transceiver. The algorithm may be resident in a processor co-located with the first or second adaptive antenna system.

Certain embodiments may include a plurality of transceivers of which one or more transceivers have adaptive antenna systems coupled to them; the algorithm resident in the network controller is configured to control the selection of radiation modes of all adaptive antenna systems in the communication system, survey communication link metrics for all transceivers with adaptive antenna systems as the transceivers establish communication links with client devices utilizing the radiation modes of the adaptive antenna systems, and select transceiver/client pairings to establish communication links concurrently with other transceivers in the communication system such that minimal noise level is optimized for in the transceivers in the communication system.

Certain embodiments may otherwise include wherein the algorithm resident in the network controller is configured to control the selection of radiation modes of all adaptive antenna systems in the communication system, survey communication link metrics for all transceivers with adaptive antenna systems as the transceivers establish communication links with client devices utilizing the radiation modes of the adaptive antenna systems, and select frequency channels for said transceivers for the transceiver/client pairings to establish communication links concurrently with other transceivers in the communication system such that minimal noise level is optimized for in the transceivers in the communication system.

Certain embodiments may otherwise include wherein the first and second radio frequency transceivers operate at frequency F1. Certain embodiments may otherwise include wherein the two or more transceivers with adaptive antenna systems operate at frequency F1.

While this disclosure contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be exercised from the combination, and the claimed combination may be directed to a sub-combination or a variation of a sub-combination.

The invention claimed is:

1. A network communication system for servicing wireless communication links between each of a plurality of client devices and a network, respectively, the network communication system comprising:
   a first access point configured to operate on a first channel,
   a second access point configured to operate on a second channel that is different than the first channel, and
   a network controller;
   the first access point comprising an adaptive antenna system associated therewith, the adaptive antenna system being configurable in one of a plurality of possible modes, wherein the adaptive antenna system exhibits a distinct radiation pattern when configured in each of the plurality of possible modes; and
   the network controller being adapted to execute an algorithm for determining a selected mode of the adaptive antenna system for a given time period, the algorithm comprising the steps of:
      with the first access point, surveying each of the plurality of client devices available for communication with the network,
      configuring the adaptive antenna system of the first access point in each of the plurality of possible modes thereof, and for each mode, measuring a channel quality indicator (CQI) associated with the adaptive antenna system of the first access point and each of the plurality of client devices, storing, on a network, antenna mode data corresponding to each mode, device, and channel quality indicator of the adaptive antenna system, selecting one of the plurality of possible modes as the selected mode for the adaptive antenna system of the first access point based on the antenna mode data, wherein the selected mode is selected to improve the channel quality indicator at the second access point, and configuring the adaptive antenna system of the first access point in the selected mode, wherein the selected mode is the one of the plurality of possible modes which achieves greatest throughput of the network, wherein the greatest throughput of the network is achieved upon balancing device load among each channel of each of the first access point and the second access point, wherein when the adaptive antenna system is configured in the selected mode, a radiation pattern associated with the selected mode is steered such that a null of the radiation pattern is pointed towards one or more of the plurality of client devices that is in communication with the second access point, and wherein a noise floor of the first access point is limited by one or more frequency components generated by the second access point.

2. The network communication system of claim 1, wherein the adaptive antenna system is characterized by: a radiating element, one or more parasitic elements positioned adjacent to the radiating elements, and one or more active tuning components, each of the one or more active tuning components is coupled to one of the one or more parasitic elements and configured to adjust a current mode of the respective parasitic element.

3. The network communication system of claim 2, wherein the active tuning components are individually selected from the group consisting of: switches, tunable capacitors, tunable inductors, MEMs devices, tunable phase shifters, and diodes.

4. The network communication system of claim 1, wherein the second access point comprises a second adaptive antenna system being configurable in one of a plurality of possible second modes associated therewith, wherein the second adaptive antenna system exhibits a distinct radiation pattern when configured in each of the plurality of possible second modes.

5. The network communication system of claim 4, comprising three or more access points.

6. The network communication system of claim 1, wherein the antenna mode data further comprises frequency or channel information.

7. The network communication system of claim 1, wherein the selected mode is the one of the plurality of possible modes which achieves a prioritized throughput according to a network preference for individual device throughput.

8. The network communication system of claim 1, wherein the CQI is selected from the group consisting of: signal to interference and noise ratio (SINR), receive signal strength indicator (RSSI), and modulating coding schemes (MCS).

9. A network communication system for servicing wireless communication links between each of a plurality of client devices and a network, respectively, the network communication system comprising:

a first access point configured to operate on a first channel, the first access point comprising a modal antenna configurable to operate in a plurality of modes, each mode of the plurality of modes having a distinct radiation pattern;

a second access point configured to operate on a second channel that is different than the first channel; and a network controller configured to:
configure the modal antenna in each of the plurality of modes;

determine a channel quality indicator (CQI) for each mode of the plurality of modes, the CQI associated with each of the plurality of client devices and the modal antenna;

store data indicative of the CQI for each of the plurality of modes;

determine one of the plurality of modes as a selected mode of operation for the modal antenna of the first access point based, at least in part on the data, wherein the selected mode is selected to improve the channel quality indicator at the second access point; and configure the modal antenna in the selected mode of operation, wherein the selected mode is the one of the plurality of possible modes which achieves greatest throughput of the network, wherein the greatest throughput of the network is achieved upon balancing device load among each channel of each of the first access point and the second access point, wherein when the adaptive antenna system is configured in the selected mode, a radiation pattern associated with the selected mode is steered such that a null of the radiation pattern is pointed towards one or more of the plurality of client devices that is in communication with the second access point, and wherein a noise floor of the first access point is limited by one or more frequency components generated by the second access point.

* * * * *